(12) United States Patent
Chen

(10) Patent No.: US 6,992,747 B2
(45) Date of Patent: Jan. 31, 2006

(54) METHOD AND REPAIRING DEFECTS IN A LIQUID CRYSTAL DISPLAY

(75) Inventor: Hsin-Hung Chen, Jhutang Township, Changhua County (TW)

(73) Assignee: AU Optronics Corp., Hsinchu (TW)

( * ) Notice: Subject to any disclaimer, the term of this patent is extended or adjusted under 35 U.S.C. 154(b) by 37 days.

(21) Appl. No.: 10/860,506

(22) Filed: Jun. 3, 2004

(65) Prior Publication Data

US 2004/0246433 A1    Dec. 9, 2004

(30) Foreign Application Priority Data

Jun. 3, 2003    (TW) .................................. 92115011

(51) Int. Cl.
*G02F 1/13*    (2006.01)

(52) U.S. Cl. ..................................................... 349/192

(58) Field of Classification Search ................. 349/192
See application file for complete search history.

(56) References Cited

U.S. PATENT DOCUMENTS 6,080,528 A * 6/2000 Ho et al. ..................... 349/192

* cited by examiner

*Primary Examiner*—James A. Dudek
(74) *Attorney, Agent, or Firm*—Thomas, Kayden, Horstemeyer & Risley

(57) ABSTRACT

A method for repairing a liquid crystal display. An LCD having a plurality of pixels is provided, each pixel including at least a pixel electrode and a TFT. The pixel, containing a particle, is irradiated by laser along the profile of the particle to cut pixel electrodes on the path, isolating the overlap area of pixel electrode and particles from non-overlap area of pixel electrode and particles, followed by repair of the defect by conventional electric repair.

15 Claims, 6 Drawing Sheets

METHOD AND REPAIRING DEFECTS IN A LIQUID CRYSTAL DISPLAY

BACKGROUND OF THE INVENTION

1. Field of the Invention

The invention relates to a method for repairing defects in a liquid crystal display and more particularly to a method for repairing bright dot defects in display area of Liquid Crystal Display.

2. Description of the Related Art

Liquid crystal displays have become widely used, with a working principle based on alignment condition of liquid crystal molecules changing by application of an electrical field to change the path of light passing therethrough. One LCD type is passive matrix and the other active matrix. Color of each pixel is determined by current of an end transistor in the row and the start transistor in the column. Advantages of passive matrix LCD are low cost and small size, however, slow scanning speed and small viewing angle are drawbacks. In active matrix LCD, each pixel is controlled by a transistor, and scanning is fast.

The active matrix LCD includes more than million transistors and display units, each display unit consisting of three sub display units (R, G and B).

Dot defects are formed during process of the active matrix LCD, creating light or dark defects. LCD units having fewer than five dot defects are judged as A class, however, because light defects, light defects are more noticeable to users, they are repaired into dark defects.

There are many causes of light defects, such as particles between the array substrate and the color filter substrate. Referring to FIG. 1, 110 is a signal line, 120 is a gate line, 130 is a pixel electrode, 140 is a particle and 160 is a TFT. When a particle 140 occurs in the pixel electrode region 130, the pixel cannot maintain sufficient charge. In FIG. 2, 140 is a particle, 132 is a color filter, 134 is an ITO electrode, 155 is a substrate and 130 is a pixel electrode. Because the particle 140 occurs in the pixel, signals transfer from TFT 160 (array substrate side) to the ITO electrode 134 (color filter side), causing a bright dot.

In general, bright dot defects caused by particles in the pixel are repaired by directly or indirectly shorting TFT or other repair circuit by laser to link pixel electrode and gate line or signal line, however, these methods cannot repair light defects formed by particles in the pixel since voltage of signal line or scan line will be lost from array substrate side to the color filter side, causing vertical-line type defects, horizontal-line type defects or cross-line type defects.

SUMMARY OF THE INVENTION

An object of the present invention is to provide a method of repairing bright dot defect containing particles in pixels in liquid crystal display. The overlap area of pixel electrode and particle is separated from non-overlap area of pixel electrode and particle by, for example, laser beam. Signals cannot transmit from the substrate with pixel electrode to another substrate with common electrode through the particle, such that the LCD can then be repaired by conventional electric repair.

Another method for repairing defects in a LCD comprises providing a first substrate and a second substrate opposite the first substrate, the first substrate having a first electrode with a particle thereon and the second substrate having a second electrode with the particle thereon; and isolating an overlap area of the first electrode and the particle from a non-overlap area of the first electrode and the particle by, for example, irradiating with laser. The first and second electrodes can be pixel electrode and common electrode or vice versa.

The laser used can be UV or YAG, but is not limited thereto. The laser isolates overlap area of first electrode and particle form non-overlap area of first electrode and particle, stopping signals losing from the first substrate to the second substrate. The type of laser used is determined by the system or application. As well, the above laser repair method includes irradiating on the second electrode of the second substrate with laser to repair the defect.

Consequently, a repaired liquid crystal display comprises a first substrate having a first electrode with a particle thereon and a second substrate opposite the first substrate, wherein the second substrate comprises a second electrode with the particle thereon. An overlap area of the first electrode and the particle and a non-overlap area of the first electrode and the particle are electrically isolated. The first and second electrodes can be pixel electrode and common electrode or vice versa. The repaired liquid crystal display may comprise another overlap area of the second electrode and the particle and a non-overlap area of the second electrode and the particle being electrically isolated.

BRIEF DESCRIPTION OF THE DRAWINGS

The accompanying drawings, incorporated in and constituting a part of this specification, illustrate embodiments of the invention and, together with the description, serve to explain the principles of the invention, in which.

DETAILED DESCRIPTION OF THE INVENTION

Figure 1:
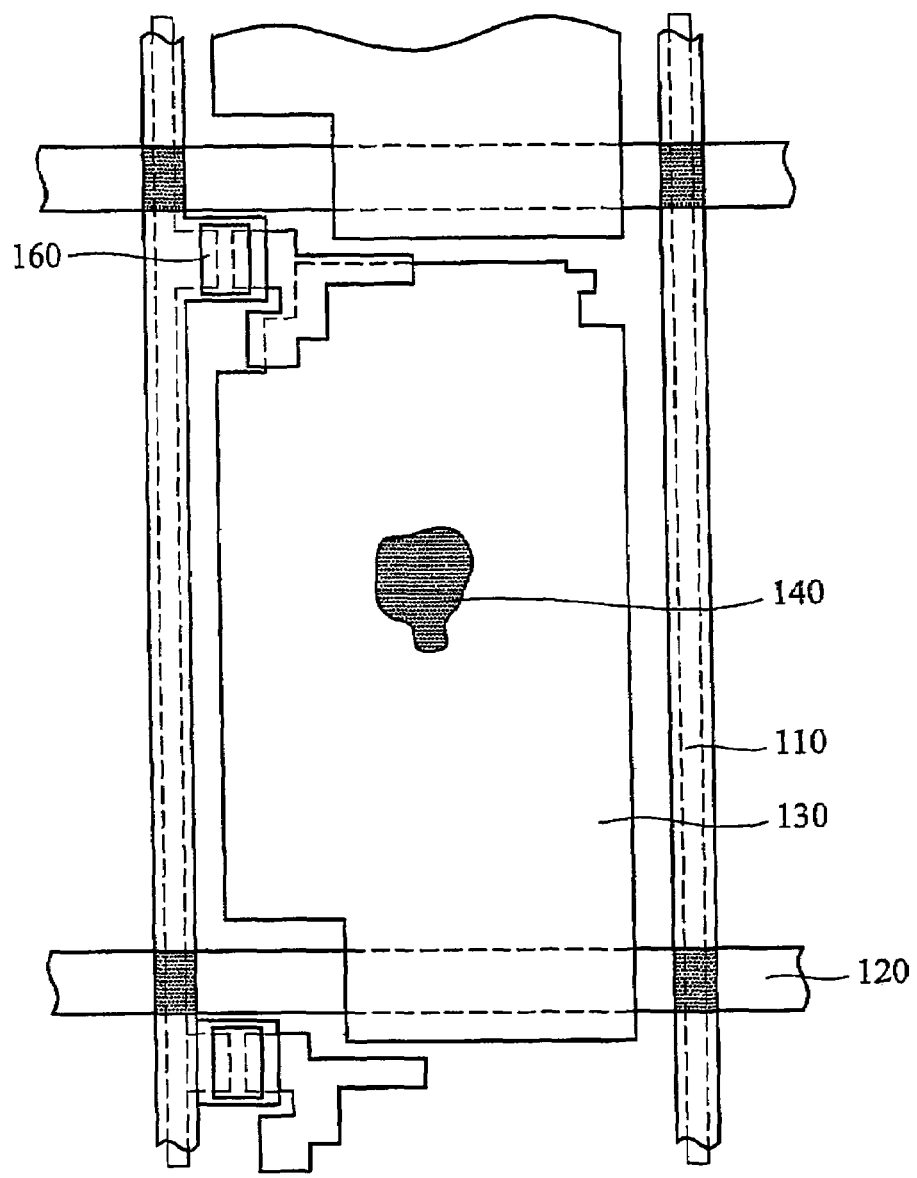
FIG. 1 is a top view of an LCD showing a particle in the pixel.
Figure 2:
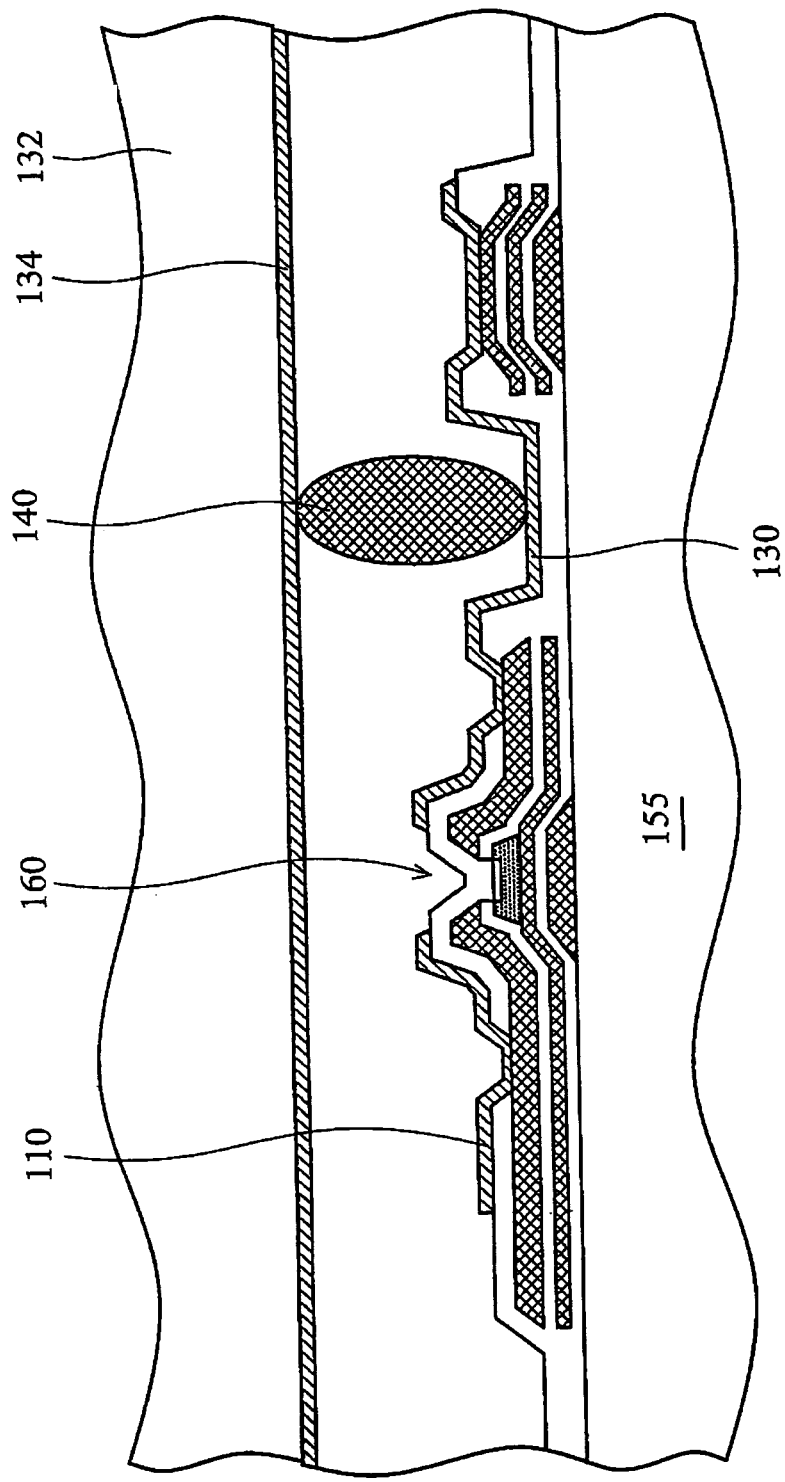
FIG. 2 is a cross section of the LCD showing a particle in the pixel.

Throughout the drawings, it is noted that the same reference numerals designate like or equivalent elements and a repeated description is thus omitted for clarity. The following embodiments respectively illustrate method for repairing a LCD applied when particles are in the center, near the signal line or near the scan line of the pixel.

First Embodiment

Figure 3:
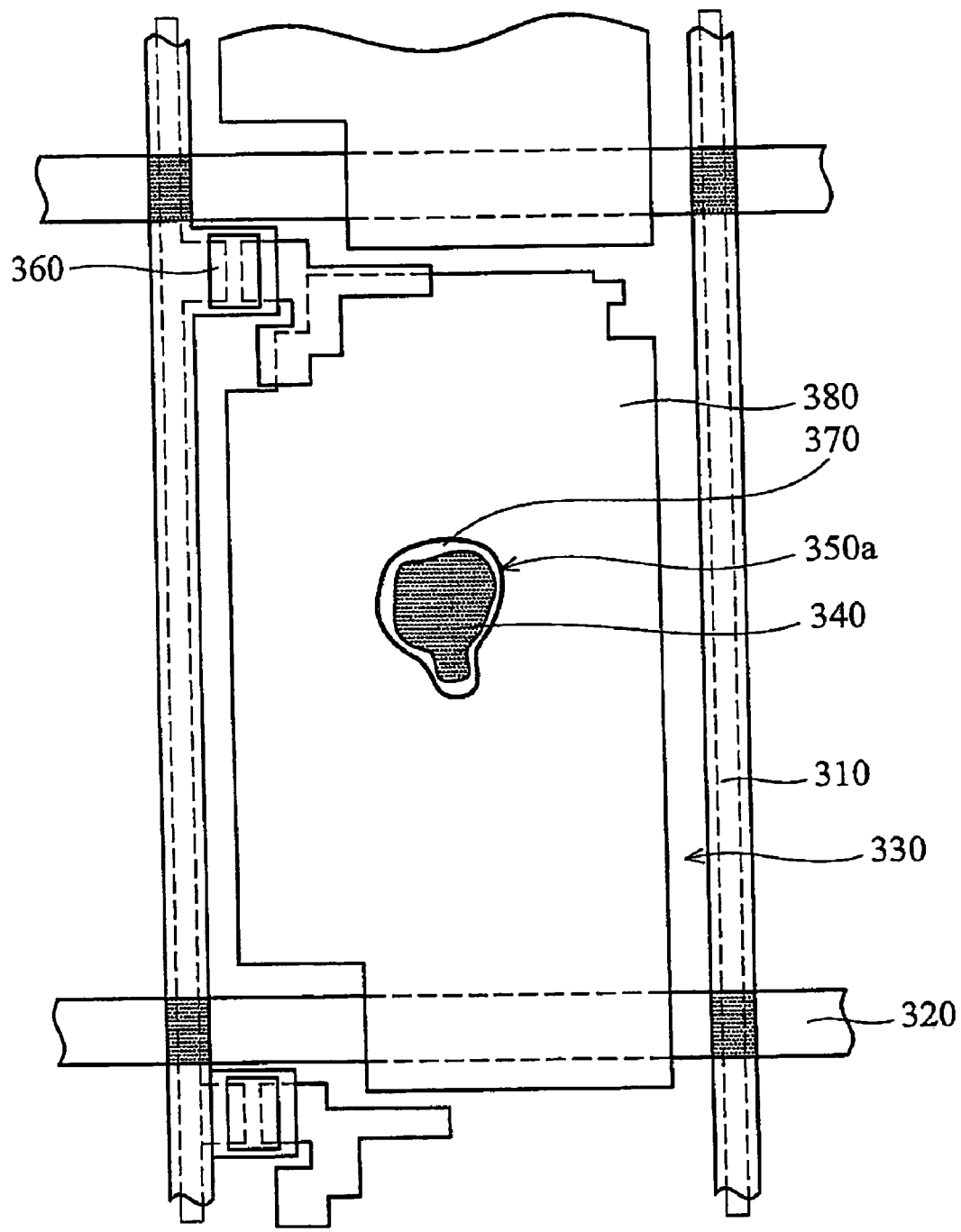
FIG. 3 shows the method for repairing a defect of the first embodiment of the present invention.

In FIG. 3, an LCD including a plurality of signal lines 310 and scan lines 320 is provided and a pixel defined by neighboring signal lines and scan lines. Each pixel includes at least a TFT 360 and a pixel electrode 330 controlled by the TFT 360. A particle 340 occurs in the pixel, such that the pixel electrode 330 includes an overlap area 370 with the particle 340 and a non-overlap area 380. The pixel electrode 330 is transparent conductive film, such as ITO.

The pixel electrode 330 is irradiated along the profile of the particle 340 by laser to form the figure as 350a. As well, the pixel electrode 330 is irradiated along the overlap area 370 to isolate the overlap area 370 and the non-overlap area 380.

Figure 4:
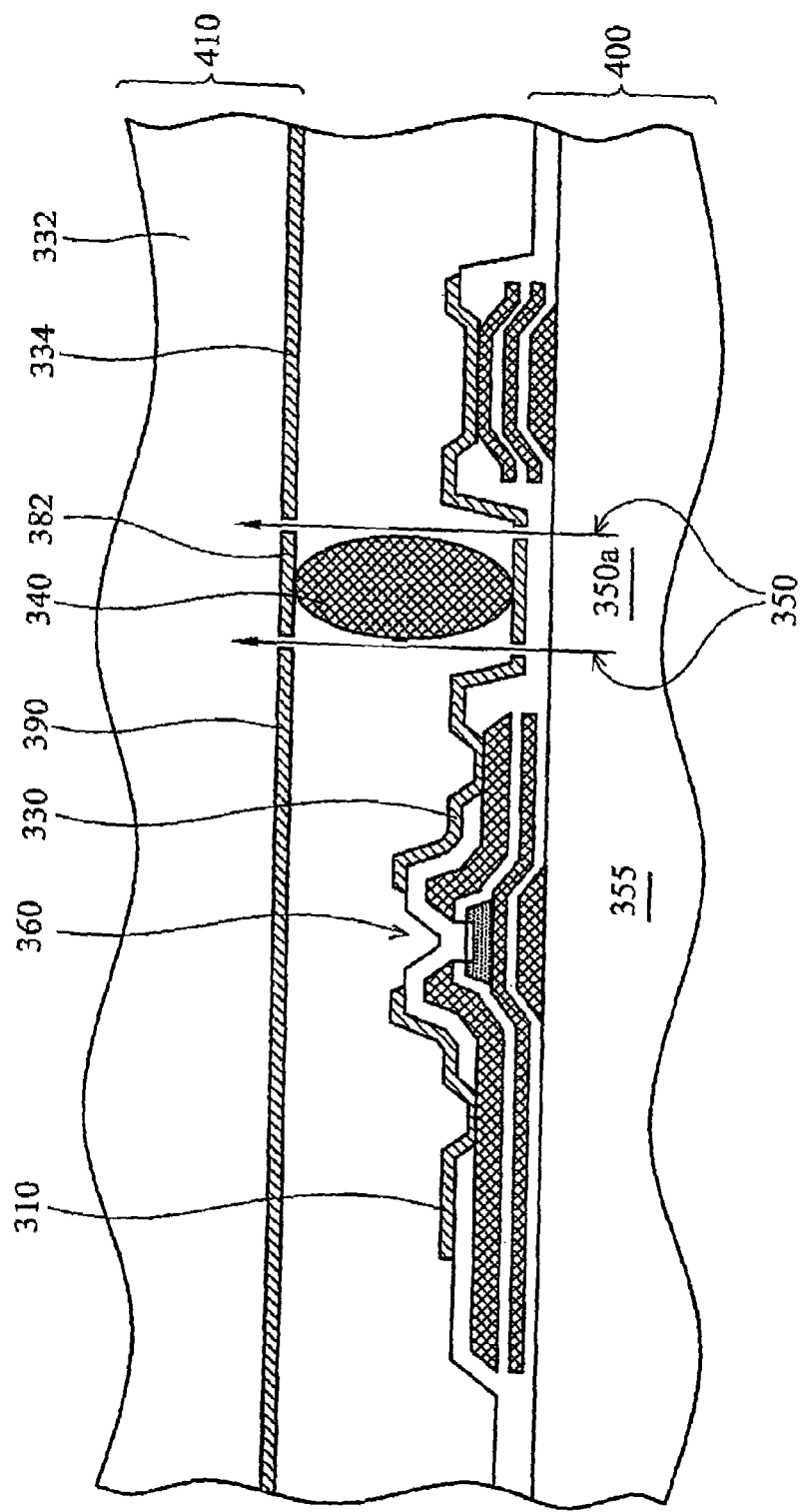
FIG. 4 is a cross section showing the method for repairing a LCD of the first embodiment of the present invention.

As shown in FIG. 4, the pixel electrode 330 is irradiated along the profile of the particle 340 by laser 350 to cut the pixel electrode 330 on the path, isolating overlap area of pixel electrode 330 and particle 340 from non-overlap area of pixel electrode 330 and particle 340. As shown in FIG. 4, the substrate 400 having the pixel electrode 330 and the substrate 410 having the common electrode 334 are irradiated by laser 350. The substrate 400 can be the thin film transistor substrate, and the second substrate 410 can be the color filter substrate. As well, when the overlap area 350a of pixel electrode 330 and particle 340 is isolated from non-overlap area of pixel electrode 330 and particle 340, it stop signals losing from the substrate 400 to common electrode 334 of the substrate 410 through the particle 340. Because the overlap area 350a of the pixel electrode 330 and particle 340 is isolated from the non-overlap area of pixel electrode 330 and particle 340 and the overlap area 382 of the common electrode 334 and particle 340 is isolated from the non-overlap area 390 of common electrode 334 and particle 340 by laser 350, the bright dot defects can be directly repaired by conventional electric repair.

However, the effect is similar if only the substrate 400 or the substrate 410 is irradiated. That is, either isolating the overlap area 350a of the pixel electrode 330 and particle 340 from the non-overlap area of pixel electrode 330 and particle 340 or isolating the overlap area 382 of the common electrode 334 and particle 340 from the non-overlap area 390 of common electrode 334 and particle 340 can solve the defect problem.

Second Embodiment

Figure 5:
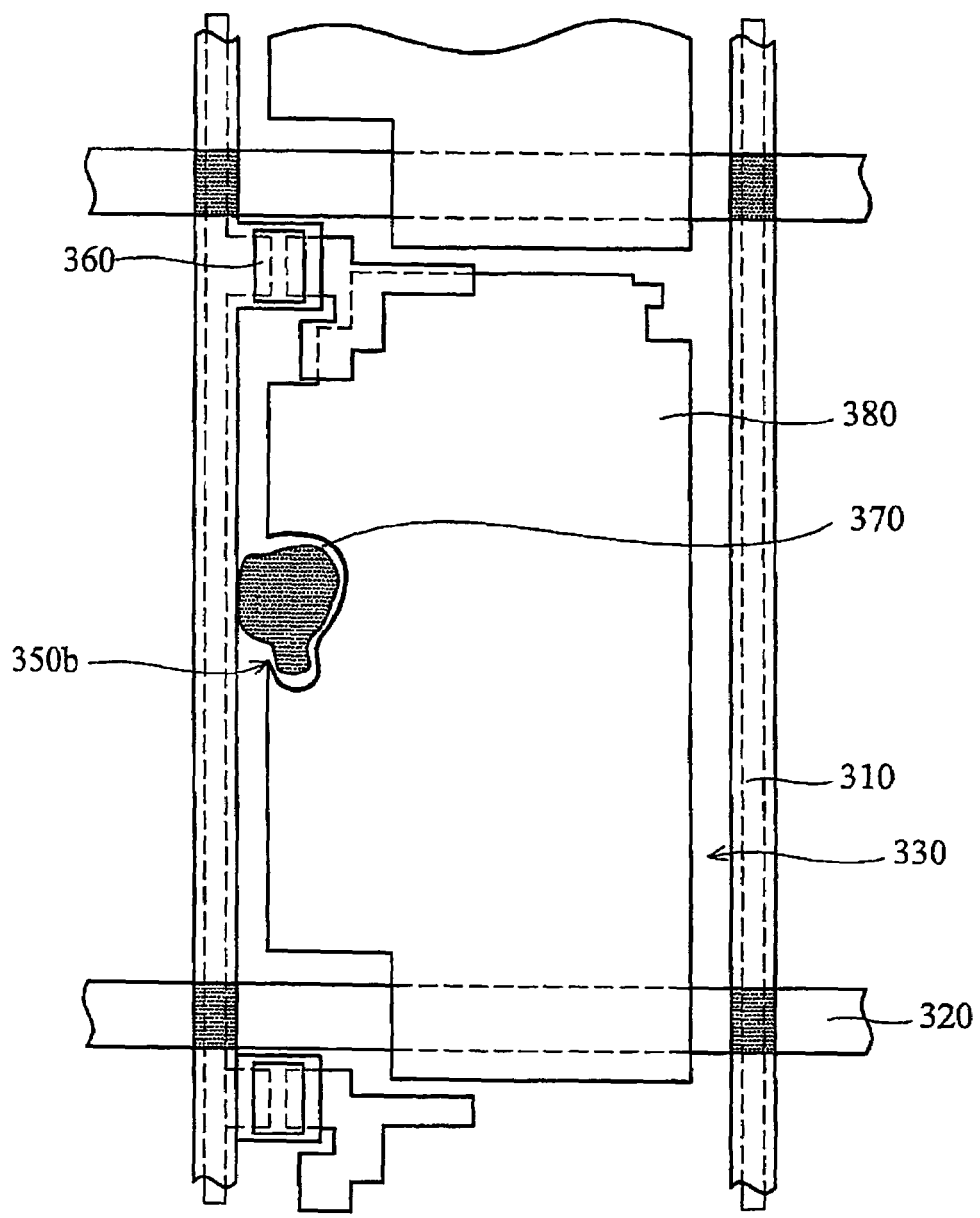
FIG. 5 shows the method for repairing a defect of the second embodiment of the present invention.

In this embodiment the particle 340 is near the signal line 310. Thus, as shown in FIG. 5, the laser must avoid the signal line 310 when cutting. As in 350b, only overlap area 370 of the pixel electrode 330 and particle is cut. The LCD is then repaired by conventional electric repair to repair the bright dot defect.

Third Embodiment

Figure 6:
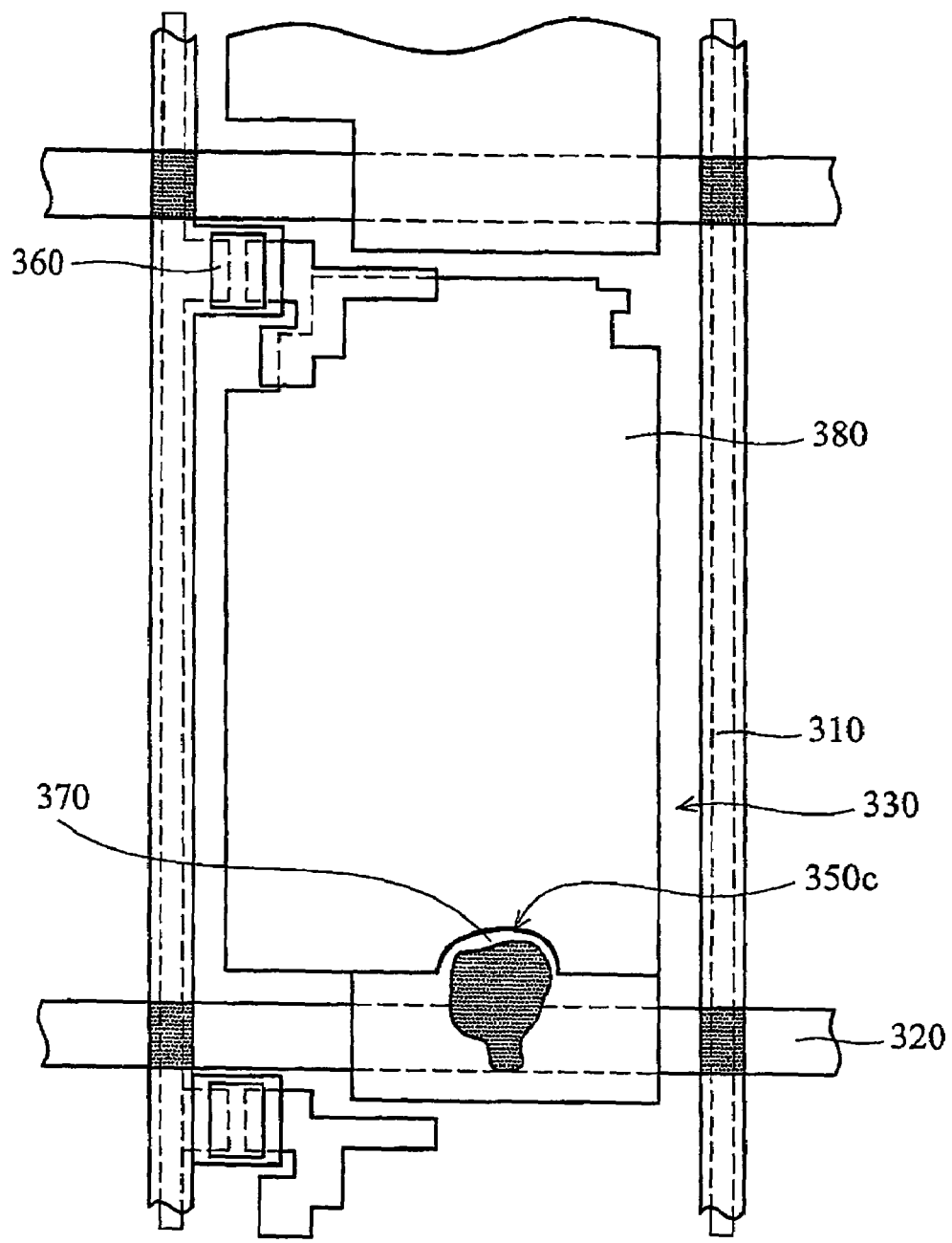
FIG. 6 shows the method for repairing a defect of the third embodiment of the present invention.

As shown in FIG. 6, because the particle is near the scan line 320, the laser must avoid the scan line 320 when cutting. As in 350c, only the overlap area 370 of pixel electrode 330 and the particle is cut. The LCD is then repaired by conventional electric repair to repair the bright dot defect.

The method for repairing LCDs with particle in accordance with the present invention solves the line defect problems of conventional electric repair.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for repairing defects in a liquid crystal display, comprising:
providing a first substrate and a second substrate opposite the first substrate, the first substrate having a first electrode with a particle thereon and the second substrate having a second electrode with the particle thereon; and
isolating an overlap area of the first electrode and the particle from a non-overlap area of the first electrode and the particle.

2. The method according to claim 1, wherein the first electrode is a pixel electrode and the second electrode is a common electrode.

3. The method according to claim 1, wherein the first electrode is a common electrode and the second electrode is a pixel electrode.

4. The method according to claim 1, wherein the overlap area of the first electrode and the particle is isolated from the non-overlap area of the first electrode and the particle by irradiating with laser.

5. The method according to claim 1, further comprising isolating another overlap area of the second electrode and the particle from another non-overlap area of the second electrode and the particle.

6. The method according to claim 1, wherein the overlap area of the first electrode and the particle is isolated from the non-overlap area of the first electrode and the particle by irradiating with laser, and the another overlap area of the second electrode and the particle is also isolated from the another non-overlap area of the second electrode and the particle by irradiating with laser.

7. A method for repairing defects in a liquid crystal display, comprising:
providing a liquid crystal display having a plurality of pixels, a first pixel of the pixels comprising a pixel electrode with a particle, wherein the pixel electrode has an overlap area with the particle and a non-overlap area; and
cutting the pixel electrode along the profile of the overlap area.

8. The method according to claim 7, wherein the pixel electrode is cut along the profile of the overlap area by irradiating with laser.

9. The method according to claim 7, wherein the liquid crystal display comprises a first substrate comprising the pixel electrode and a thin film transistor, and a second substrate comprising a common electrode.

10. The method according to claim 9, wherein the common electrode is cut along the profile of the overlap area at the same time when cutting the pixel electrode along the profile of the overlap area.

11. The method according to claim 10, wherein the pixel electrode and the common electrode are cut along the profile of the overlap area by irradiating with laser.

12. A repaired liquid crystal display, comprising:
a first substrate comprising a first electrode with a particle thereon, an overlap area of the first electrode and the particle and a non-overlap area of the first electrode and the particle being electrically isolated; and
a second substrate opposite the first substrate, comprising a second electrode with the particle thereon.

13. The repaired liquid crystal display according to claim 12, wherein the first electrode is a pixel electrode and the second electrode is a common electrode.

14. The repaired liquid crystal display according to claim 12, wherein the first electrode is a common electrode and the second electrode is a pixel electrode.

15. The repaired liquid crystal display according to claim 12, wherein another overlap area of the second electrode and the particle and a non-overlap area of the second electrode and the particle being electrically isolated.

* * * * *